_United States Patent Office_

3,440,209
Patented Apr. 22, 1969

3,440,209
POLYMERIC COMPOSITIONS CONTAINING
SUBSTITUTED 1,4-BENZOQUINONES
Raymond C. Harris and Gordon C. Newland, Kingsport,
Tenn., assignors to Eastman Kodak Company, Rochester, N.Y., a corporation of New Jersey
No Drawing. Continuation-in-part of application Ser. No. 594,268, Nov. 14, 1966. This application Apr. 24, 1968, Ser. No. 723,927
Int. Cl. C08f 45/60, 47/04, 29/02
U.S. Cl. 260—41        7 Claims

ABSTRACT OF THE DISCLOSURE

Polymeric compositions, particularly polyolefins, stabilized against the degradative effects of ultraviolet light with substituted 1,4-benzoquinones.

---

This application is a continuation-in-part of Ser. No. 594,268, filed Nov. 14, 1966 now U.S. Patent No. 3,391,104 issued July 2, 1968 which, in turn is a continuation of Ser. No. 269,745, filed Apr. 1, 1963, which is a continuation-in-part of Ser. No. 162,985, filed Dec. 28, 1961, both of which are now abandoned.

This invention relates generally to normally solid poly-α-olefin polymers and particularly to the problem of stabilizing them relative to the degradative effects of light.

Normally solid poly-α-olefin polymers such as the well known normally solid polyethylene and polypropylene polymers (commonly referred to merely as polyethylene and polypropylene) are thermoplastic, synthetic resins which have gained widespread use as materials of construction. However, as is also well known, normally solid poly-α-olefin polymers undergo a photochemical degradation when exposed to sunlight, particularly ultraviolet light, and air. This effect is frequently termed weathering. It appears to be a photooxidation process which causes rupture of the polymer chains and formation of carbonyl (=C=O) groups. As this degradation progresses, articles manufactured from these polymers tend to crack, become brittle and lose tensile strength to the extent of mechanical failure.

A general object of this invention is to provide a poly-α-olefin plastic composition wherein the poly-α-olefin polymeric component thereof is stabilized relative to the degradative effects of light.

A specific object of this invention is to provide a poly-α-olefin plastic composition comprising an additive effective to stabilize the poly-α-olefin polymer component of the composition against degradation by ultraviolet light.

These objects and others are achieved by this invention which is based on our discovery that certain organic pigments are effective light stabilizers for normally solid poly-α-olefin polymers.

In summary, this invention comprises a light stabilized, poly-α-olefin plastic composition comprising: (1) a normally solid, normally light unstable, poly-α-olefin polymeric component, and (2) an organic pigment additive that is a member of the group of 1,4-benzoquinones defined by the general formula:

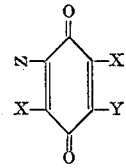

wherein X in each case is independently selected from the group of hydrogen and halide radicals, and Y and Z are independently selected from the group consisting of amino, alkylamino, alkyl, substituted alkyl, arylamino, substituted arylamino, alkoxy, phenoxy, halide, nitro, hydroxy, arylsulfonyl and aminoheterocyclic radicals with at least one of said Y and Z radicals containing a nitrogen atom.

The poly-α-olefin polymeric component of the composition of this invention consists essentially of at least one poly-α-olefin polymer which is a member of the group of high and low density, normally solid, homopolymers and copolymers of α-monoolefinic hydrocarbons having 2–10 carbon atoms. It can also consist essentially of a blend of poly-α-olefin polymers that are members of this group. Examples of poly-α-olefin polymers of this group are the homopolymers and copolymers of ethylene, propylene, butene-1, isobutylene, pentene-1,2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, copolymers of ethylene and propylene and the like. While homopolymers and copolymers of styrene and allylbenzene may not technically considered members of the olefin class it is to be understood that they may also be employed. Processes for preparing these polymers are well known and described in detail in the prior art. See, for example, the U.S. Patent No. 2,912,424 of Cash and the U.S. Patent No. 2,917,500 of Hagemeyer et al., which describe typical catalytic processes for the preparation of homopolymers and copolymers of these poly-α-olefins. In general, the poly-α-olefin polymers of this invention are thermoplastic, normally solid synthetic resins having average molecular weights of at least about nine thousand. In the average molecular weight range from about nine thousand to about twelve thousand the poly-α-olefin polymers generally are wax-like at room temperature while above an average molecular weight of about twelve thousand these poly-α-olefin polymers have greater consistencies.

The organic pigment additive of this invention functions to stabilize the poly-α-olefin polymeric component relative to the adverse effects of ultraviolet light. It is characterized not only by color but also by compatibility with the polymeric component in that the resulting plastic compositions do not "bloom" or exude the pigment. Typical examples of organic pigments within the preceding general formula are listed as follows:

2,5-dichloro-3,6-diamino-1,4-benzoquinone
2,5-dichloro-3,6-bis(o-anisidino)-1,4-benzoquinone 2,5-dichloro-3,6-bis(p-octylanilino)-1,4-benzoquinone
2-butoxy-3,6-dichloro-5-(9-methyl-3-carbazalylamino)-1,4-benzoquinone
2,5-dichloro-3-[3-(dimethylamino)-propylamino]-6-(9-methyl-3-carbazalylamino)-1,4-benzoquinone
2,5-dichloro-3-(p-anisidino)-6-methoxy,1,4-benzoquinone
2,5-dichloro-3-(p-chloroanilino)-6-phenoxy-1,4-benzoquinone
2,5-dianilino-1,4-benzoquinone
2,5-bis(o-anisidino)-1,4-benzoquinone
2,5-dichloro-3,6-bis(o-anisidino)-1,4-benzoquinone
2,5-dichloro-3,6-bis(p-acetylanilino)-1,4-benzoquinone The organic pigments useful in this invention are readily prepared from readily available reactants by procedures well known in the art. Further understanding of these procedures will be obtained from the following examples.

Preparation of 2,5-dichloro-3,6-dianilino-1,4-benzoquinone

Admix 49.2 parts (0.2 molecular equivalent) chloranil, 37.2 parts (0.4 molecular equivalent) aniline, 54.0 parts (0.66 molecular equivalent) anhydrous sodium acetate and 474 parts absolute ethanol. Heat the mixture to vigorous reflux and reflux for 2½ hours. Allow the resulting reaction mixture to stand at room temperature for 12 hours whereby a solid precipitate is formed. Filter the reaction mixture and wash the filter cake with warm water and then with ethanol. Dry the washed filter cake at 60° C. whereby the desired product is obtained. The product 2,5-dichloro-3,6-dianilino-1,4-benzoquinone is obtained at a typical yield of 69 parts (0.19 molecular equivalent) which is equivalent to about 96% of the theoretical yield.

Preparation of 2,5-dichloro-3,6-bis(p-octylanilino)-1,4-benzoquinone

Admix 24.6 parts (0.1 molecular equivalent) of chloranil, 41.0 parts (0.2 molecular equivalent) of p-octylaniline, 27.0 parts (0.33 molecular equivalent) of anhydrous sodium acetate and 237 parts of absolute ethanol. Heat the mixture to reflux and reflux for about 3.5 hours, thereby forming a reaction mixture. Cool the reaction mixture to about 40° C., whereby a solid is precipitated. This solid is the desired product. Filter the product from the reaction mixture and then wash it, first with ethanol and then with water. Suck it fairly dry and then dry at 60° C. The product, 2,5-dichloro-3,6-bis(p-octylanilino)-1,4-benzoquinone, is characterized by a bright blue color in concentrated sulfuric acid.

A typical analysis is—Calculated by weight: C, 69.96%; H, 7.6%; Cl, 7.13%. Found by weight: C, 69.46%; H, 7.13%; Cl, 12.06%.

Preparation of 2,5-dichloro-3,6-bis(o-anisidino)-1,4-benzoquinone

Admix 24.6 parts (0.1 molecular equivalent) of chloranil, 24.6 parts (0.2 molecular equivalent) of o-anisidine, 27.0 parts (0.33 molecular equivalent) of anhydrous sodium acetate and 300 parts of absolute ethanol. Heat the mixture to reflux and reflux for about 3.5 hours, forming thereby a reaction mixture. Cool the reaction mixture to room temperature, whereby a precipitate is formed. Filter the reaction mixture and wash the filter cake with ethanol and then with water. After the water has drained from the filter cake, dry the filter cake at 60° C. The dry filter cake is the desired product 2,5-dichloro-3,6-bis(o-anisidino)-1,4-benzoquinone.

Preparation of 2-butoxy-3,6-dichloro-5-(9-methyl-3-carbazalylamino)-1,4-benzoquinone Admix 12.3 parts (0.05 molecular equivalent) of chloranil and 4.25 parts (0.052 molecular equivalent) of sodium acetate in 250 parts of n-butanol and heat to gentle reflux with good agitation. Boil for 2 minutes and allow to cool slowly to about 25° C. and filter. Add to the filtrate, in small portions, a solution of 9.8 parts (0.05 molecular equivalent) of 3-amino-9-methylcarbazole in 100 parts of n-butanol. Warm the reaction mixture to about 40° C. and stir for about 1 hour at this temperature. Cool to 15° C. and filter. Thereafter, wash the precipitate with ethanol and dry at 60° C. The product melts at 155–157° C. which upon recrystallization from ethanol gives a product melting at 156.5–157° C. having the following analysis.

*Analysis.*—Calculated by weight: C, 62.3%; H, 4.56%; O, 10.83%; N, 6.32%; Cl, 15.99%. Found by weight: C, 63.10%; H, 4.70%; O, 10.84%; N, 6.82%; Cl, 15.53%.

Preparation of 2,5-dichloro-3-[3-(dimethylamino)propylamino]-6-(9-methyl-3-carbazolyamino) - 1,4 - benzoquinone Admix 4.43 parts (0.01 molecular equivalent) of 2-hydroxy - 3,6 - dichloro-5(9-methyl-3-carbazolylamino)-1,4-benzoquinone, 2.5 parts (0.03 molecular equivalent) of sodium acetate, 1.53 parts (0.015 molecular equivalent) of dimethylaminopropylamine and about 100 parts of absolute ethanol. Heat the mixture to reflux and reflux for about 2.5 hours. Cool the reaction mixture to 20° C. and filter. Thereafter, the precipitate is washed with water and dried at 60° C. The product is a brown powder having the following analysis.

*Analysis.*—Calculated by weight: C, 61.14%; H, 5.14%; O, 6.79%; N, 11.89%; Cl, 15.04%. Found by weight: C, 61.31%; H, 5.09%; O, 7.04%; N, 11.87%; Cl, 14.82%.

The above preparations are representative of the substituted 1,4-benzoquinone compounds. As mentioned previously, all of these compounds are effective ultraviolet light inhibitors for polyolefins.

Concentration of the substituted 1,4-benzoquinones in the poly-α-olefin plastic composition of this invention depends generally upon the extent of light stabilization desired. This in turn depends upon many variables, including the end use of the poly-α-olefin plastic composition. However, for most purposes a concentration in a range from about 0.1 to about 10% by weight of the poly-α-olefin polymeric component is an effective light stabilizing concentration.

The plastic compositions of this invention are prepared by incorporating the substituted 1,4-benzoquinones into the poly-α-olefin polymeric component. Generally such incorporation is performed by any one of a number of well known methods, such as roll compounding, extrusion, solvent mixing and the like. For example, such incorporation can be performed by heating or otherwise softening the poly-α-olefin polymeric component to a workable consistency and then working in as roll compounding the substituted 1,4-benzoquinones until a substantially uniform mixture or dispersion is obtained.

The resulting plastic compositions may be cast or molded into the desired article or articles such as, for example, pellets, sheeting, films, bars, filaments, specially shaped structural elements and the like as by conventional casting and molding techniques which include extrusion, blow molding and the like.

The following example show the effectiveness of the substituted 1,4-benzoquinones as ultraviolet light inhibitors for polyolefins.

EXAMPLE 1

This example illustrates a polyethylene plastic composition containing 2,5-dichloro-3,6-bis(p-octylanilino)-1,4-benzoquinone, its preparation and typical light stability results.

Incorporate by roll compounding one part by weight of the substituted 1,4-benzoquinone into 100 parts of a conventional polyethylene having a density of 0.92. Hold the rear roll of the roll compounder at 220° F. and the front roll at 270° F. for a milling time of 4 minutes. At the end of this time, compression mold the roll mix into a flat plate 0.048-inch thick.

In order to test the light stability of this composition subject 100 parts of the same polyethylene without a light stabilizing substituted 1,4-benzoquinone to four minutes of milling on the roll compounder with the rear roll at 220° F. and the front roll at 270° F. Then compression mold the milled polyethylene into a flat plate 0.048-inch thick.

Expose outdoors both plates and after a period of time measure the carbonyl content of each plate by infrared adsorption at 5.82 microns. A carbonyl content of a polyethylene composition containing a substituted 1,4-benzoquinone which is less than the carbonyl content shown by the polyethylene without a light stabilizing substituted 1,4-benzoquinone indicates the former has a light stabilizing effect on the polyethylene component of the composition. Typical test results as ascertained from plates exposed outdoors at Kingsport, Tenn., for 95 days are set forth in the following Table 1.

Table 1

| Additive: | Relative carbonyl content |
| --- | --- |
| None | 34 |
| 2,5 - dichloro - 3,6-bis(p-octylanilino)-1,4-benzoquinone | 11.2 |

It can be seen from Table 1 that the substituted 1,4-benzoquinone is effective in light stabilizing polyethylene.

EXAMPLE 2

This example illustrates a polypropylene plastic composition containing 2,5-dichloro-3,6-diamino-1,4-benzoquinone and 2,5-dichloro-3,6-bis(o-anisidino)-1,4-benzoquinone, respectively, and their preparation and typical light stability test results.

Dissolve in 2500 parts by weight of 1,2,3,4-tetrahydronaphthalene solvent 100 parts by weight of a conventional polypropylene polymer having a melt index of 0.90, forming thereby a 4% dope of the polymer. Admix with the dope 5 parts by weight of the particular substituted 1,4-benzoquinone being formulated and stir the resulting mixture for 30 minutes at 145° C., whereby the substituted 1,4-benzoquinone is uniformly incorporated in the dope. Cast the resulting dope on a ferrotype plate heated to 143° C. and evaporate the solvent therefrom. Usually about 10 minutes is required for the solvent to completely evaporate. The film which remains is about 0.003-inch thick. Quench the film in cold water and peel it from the ferrotype plate.

For the purpose of determining the light stability of the films prepared by the foregoing procedure prepare a film of the same polypropylene polymer but without a light stabilizing substituted 1,4-benzoquinone. Do this by dissolving in 2500 parts by weight of 1,2,3,4-tetrahydronaphthalene solvent 100 parts by weight of the polypropylene polymer, forming thereby a 4% dope of the polymer. Stir the dope for 30 minutes at 145° C. Cast the dope on a ferrotype plate heated to 143° C. and evaporate therefrom the solvent. After evaporation of the solvent, there remains a film of about 0.003-inch thick. Quench the film in cold water and peel it from the ferrotype plate.

To determine the light stability of the films, test specimens 2.5 inches by 0.5 inch are cut from the films. Expose the test specimens to artificial weathering in a modified Atlas Twin-Arc Weather-Ometer (Anal. Chem., 25, 460 (1953)) until they become brittle. The state of brittleness is deemed to be reached when the test specimen breaks on one hard crease with the exposed side of the film on the outside of the crease. On the basis of these exposure tests the light stabilization rating of each test specimen is determined. Stabilization rating is the ratio of the exposure time required for the development of brittleness in the test specimens containing the substituted 1,4-benzoquinones to the exposure time required for the development of brittleness in the film without a light stabilizer. A stabilization rating greater than 1 signifies that the polymeric component is light stabilized, the extent of light stabilization being in direct proportion to the numerical value of the rating. A stabilization rating equal to 1 signifies no light stabilization effect.

Typcal light stabilization ratings of the thus prepared and tested polypropylene plastic compositions are:

TABLE II

| Additive | Color | Light stabilization rating |
| --- | --- | --- |
| None | | 1 |
| 2,5-dichloro-3,6-diamino-1,4-benzoquinone. | Brown | 3 |
| 2,5-dichloro-3,6-bis(o-anisidino)-1,4-benzoquinone. | Green-brown | 6 |
| 2,5-dichloro-3,6-bis(p-octylanilino)-1,4-benzoquinone. | Amber | 10 |
| 2-butoxy-3,6-dichloro-5-(9-methyl-3-carbazalylamino)-1,4-benzoquinone. | Red-brown | 9 |
| 2,5-dichloro-3-[3-(dimethylamino)-propylamino]-6-(9-methyl-3-carbazalylamino)-1,4-benzoquinone. | Dark red | 9 |
| 2,5-dichloro-3-(p-anisidino)-6-methoxy-1,4-benzoquinone. | Brown-orange | 5 |
| 2,5-dichloro-3-(p-chloroanilino)-6-phenoxy-1,4-benzoquinone. | Brown-red | 6 |
| 2,5-dianilino-1,4-benzoquinone | Brown | 4 |
| 2,5-bis(o-anisidino)-1,4-benzoquinone | do | 6 |
| 2,5-dichloro-3,6-bis(o-anisidino)-1,4-benzoquinone. | Orange | 6 |
| 2,5-dichloro-3,6-bis(p-acetylanilino)-1,4-benzoquinone. | Brown | 10 |

Thus, each of the substituted 1,4-benzoquinones is effective to confer light stability to polypropylene.

Thus, the above data show that the substituted 1,4-benzoquinones are effective light stabilizers for the poly-α-olefin polymers within the concepts of this invention.

The substituted 1,4-benzoquinones offer certain advantages in that they provide some degree of coloring other than black. In addition, they are compatible at certain levels with the poly-α-olefin component of the compositions.

Thus, having described the invention in detail it will be understood that variations and modifications may be made within the spirit and scope of the invention as described herein and in the appended claims.

We claim:
1. A composition comprising
 (A) a polymeric component selected from the group consisting of a poly-α-olefin derived from α-monoolefinic hydrocarbons having 2 to 10 carbon atoms, polystyrene and polyallylbenzene, and
 (B) an ultraviolet light stabilizing amount of at least one substituted 1,4-benzoquinone having the general formula

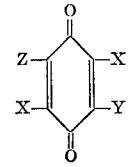

wherein X independently is hydrogen or halide, and Y and Z independently are amino, alkylamino, alkyl, substituted alkyl, arylamino, substituted arylamino, alkoxy, phenoxy, halide, nitro, hydroxy, arylsulfonyl and aminoheterocyclic radicals, at least one of Y or Z being a radical containing a nitrogen atom.

2. A composition according to claim 1 wherein said substituted 1,4-benzoquinone is present at a concentration in the range of about 0.1% to about 10.0% by weight of said polymeric component.

3. A composition according to claim 1 wherein said polymeric component is a poly-α-olefin.

4. A composition according to claim 1 wherein said substituted 1,4-benzoquinone is selected from the group consisting of 2,5-dichloro-3,6-diamino-1,4-benzoquinone; 2,5-dichloro-3,6-bis(o-anisidino)-1,4-benzoquinone; 2,5-dichloro-3,6-bis(p-octylanilino) - 1,4 - benzoquinone; 2-butoxy-3,6-dichloro-5 - (9-methyl-3-carbazalylamino) - 1,4- benzoquinone; 2,5-dichloro-3-[3 - (dimethylamino) - propylamino]-6 - (9-methyl-3-carbazalylamino) - 1,4-benzoquinone; 2,5-dichloro-3 - (p-anisidino) - 6-methoxy-1,4-benzoquinone; 2,5-dichloro-3 - (p-chloroanilino) - 6-phenoxy-1,4-benzoquinone; 2,5 - dianilino-1,4-benzoquinone; 2,5-bis(o-anisidino)-1,4-benzoquinone; 2,5 - dichloro-3,6-bis(o-anisidino)-1,4-benzoquinone; 2,5 - dichloro-3,6-bis-(p-acetylanilino)-1,4-benzoquinone.

5. A composition according to claim 4 wherein said polymeric component is polypropylene.

6. A composition according to claim 4 wherein said polymeric component is a copolymer of ethylene and propylene.

7. A composition according to claim 4 wherein said polymeric component is a polyethylene.

References Cited

UNITED STATES PATENTS

| | | | |
|---|---|---|---|
| 2,841,581 | 7/1958 | Marxer | 260—396 |
| 2,848,442 | 8/1958 | Svetlik | 260—396 |
| 2,970,152 | 1/1961 | Keller et al. | 260—396 |
| 3,037,995 | 6/1962 | Gauss et al. | 260—396 |
| 3,114,755 | 12/1963 | Covey | 260—396 |

DONALD E. CZAJA, *Primary Examiner.*

HOSEA E. TAYLOR, JR., *Assistant Examiner.*

U.S. Cl. X.R.

260—45.8, 45.9, 396